H. C. Lezott
Harrow.

No. 92,849. Patented Jul. 20. 1869.

Attest:
A. W. Almquist
John F. Brooks

Inventor:
H. C. Lezott
per Munn & Co
Attorneys.

United States Patent Office.

HENRY C. LEZOTT, OF OSAGE, IOWA.

Letters Patent No. 92,849, dated July 20, 1869.

IMPROVEMENT IN HARROWS.

The Schedule referred to in these Letters Patent and making part of the same.

*To whom it may concern:*

Be it known that I, HENRY C. LEZOTT, of Osage, in the county of Mitchell, and State of Iowa, have invented a new and improved Harrow; and I do hereby declare that the following is a full, clear, and exact description thereof, which will enable others skilled in the art to make and use the same, reference being had to the accompanying drawing, forming part of this specification.

This invention relates to improvements in harrows, designed to provide more useful, efficient, and convenient horrows than now in use.

The invention consists in the combination of the harrow with a truck, under an arrangement whereby it may be readily elevated above the ground for transportation, by the operator, whether sitting on the truck, or walking behind it.

Similar letters of reference indicate corresponding parts.

Figure 1:
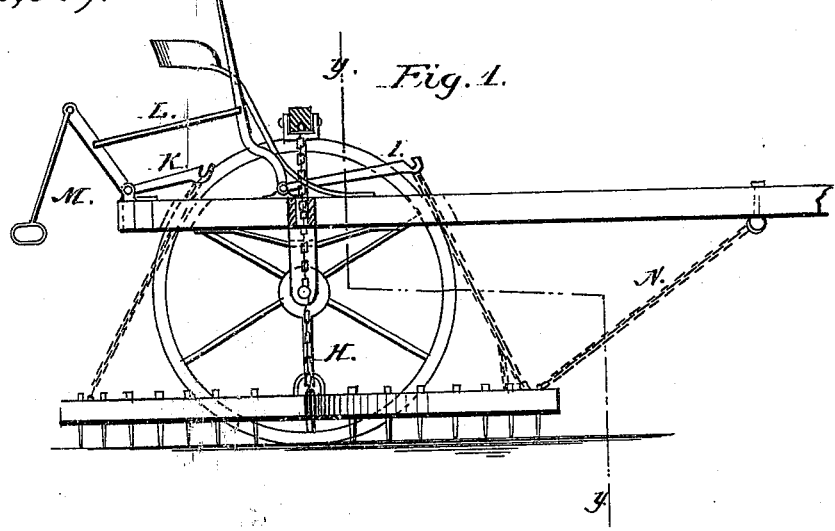
Figure 1 represents a side elevation with the axle, cut through at the line $x\ x$.
Figure 2:
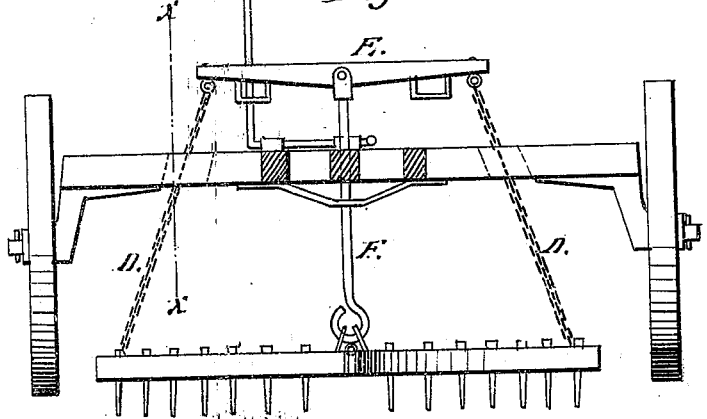
Figure 2 represents a front view taken on the line $y\ y$.
Figure 3:
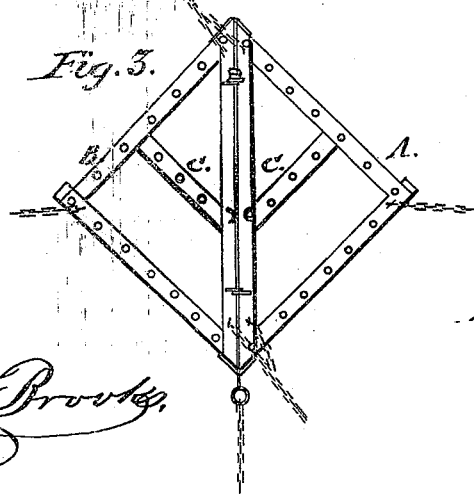
Figure 3 represents a plan view of the harrow, when detached from the truck.

I arrange the framing of the harrow in the rectangular form, represented in fig. 3, and composed of the two triangular parts A B, hinged together at the bases thereof, each part being provided with similar transverse bars C, for supporting additional teeth.

The vertex of each triangle at B is connected by a chain to a yoke, E, above the truck, and supported centrally on a rod, F, jointed to the framing by staples at the centre G.

The said rod and the chains rise up through openings in the axle of the truck.

The front and rear points of the harrow are connected by chains H, respectively, to bell-crank levers I and K, and the free arms of these levers are connected together by the connecting-rod L.

The free end of the lever I is arranged at the side of the seat, for convenient access when riding thereon, and the other is placed at the rear of the machine, to be readily reached when walking behind, and for greater convenience a handle, M, may be attached thereto.

N represents the draught-chain, by which the power is applied from the tongue.

By this arrangement for suspending the harrow, it is caused to work very steadily, and may be instantly raised off the ground, and suspended in a level condition, as will be readily perceived.

Having thus described my invention,

What I claim as new, and desire to secure by Letters Patent, is—

The yoke E, supported and connected to the harrow as described, and levers I K, also connected to the harrow, combined therewith and with the truck, substantially as specified.

HENRY C. LEZOTT.

Witnesses:
M. L. KEEF,
L. H. LEZTT.